(12) United States Patent
Lister et al.

(10) Patent No.: US 10,832,319 B1
(45) Date of Patent: Nov. 10, 2020

(54) APPLICATION PROGRAMING INTERFACE FOR PROVIDING FINANCIAL-PRODUCT ELIGIBILITY QUOTATION

(71) Applicant: Capital One Services, LLC, McLean, VA (US)

(72) Inventors: Simon Lister, Nottingham (GB); Gareth Thomas, Seattle, WA (US); Sam Boundy, London (GB); Cheryl Renton, Nottingham (GB); Heather Hackett, Nottingham (GB); Robert Noble-Eddy, Nottingham (GB); Sarah Pollicott, Nottingham (GB)

(73) Assignee: Capital One Services, LLC, McLean, VA (US)

(*) Notice: Subject to any disclaimer, the term of this patent is extended or adjusted under 35 U.S.C. 154(b) by 513 days.

(21) Appl. No.: 15/207,324

(22) Filed: Jul. 11, 2016

(51) Int. Cl.
*G06Q 40/00* (2012.01)
*G06Q 40/02* (2012.01)

(52) U.S. Cl.
CPC ........... *G06Q 40/025* (2013.01); *G06Q 40/00* (2013.01)

(58) Field of Classification Search
CPC .................................................... G06Q 40/00
See application file for complete search history.

(56) References Cited

U.S. PATENT DOCUMENTS

| | | | | |
|---|---|---|---|---|
| 5,729,700 A * | 3/1998 | Melnikoff | ............... | G06Q 40/06 705/36 R |
| 7,590,594 B2 * | 9/2009 | Gunewardena | ........ | G06Q 40/00 705/38 |
| 8,239,304 B1 * | 8/2012 | Ahmad | ................... | G06Q 20/10 705/14.67 |
| 8,504,470 B1 * | 8/2013 | Chirehdast | ............. | G06Q 40/00 705/38 |
| 2005/0133588 A1 * | 6/2005 | Williams | ............... | G06Q 20/20 235/379 |
| 2005/0278249 A1 * | 12/2005 | Jones | ...................... | G06Q 40/02 705/38 |
| 2006/0059073 A1 * | 3/2006 | Walzak | .................. | G06Q 40/00 705/35 |
| 2009/0043637 A1 * | 2/2009 | Eder | .................... | G06Q 10/067 705/35 |
| 2010/0145734 A1 * | 6/2010 | Becerra | ................. | G06Q 40/08 705/4 |

(Continued)

*Primary Examiner* — William J Jacob
(74) *Attorney, Agent, or Firm* — Finnegan, Henderson, Farabow, Garrett, & Dunner LLP

(57) ABSTRACT

A system and method for quoting a customer's eligibility for a financial product are disclosed. The system includes a memory storing instructions. The system also includes a processor configured to execute the instructions to: receive a quotation request from a client device associated with the customer, the quotation request including customer-identifying information; acquire, from a second source, information relating to a level of risk associated with the customer-identifying information; aggregate the customer-identifying information and the information relating to the level of risk; extract a plurality of variables from the aggregated data; determine an eligibility score based on the extracted variables and an eligibility model, the eligibility score indicating a likelihood of being approved for the financial product; and provide the eligibility score to the client device.

14 Claims, 5 Drawing Sheets

(56) References Cited

U.S. PATENT DOCUMENTS

| | | | | |
|---|---|---|---|---|
| 2011/0078073 A1* | 3/2011 | Annappindi | ........... | G06Q 40/02 |
| | | | | 705/38 |
| 2013/0103569 A1* | 4/2013 | Gopinathan | ......... | G06Q 40/025 |
| | | | | 705/38 |
| 2013/0246310 A1* | 9/2013 | Weiss | ..................... | G06Q 40/06 |
| | | | | 705/36 T |
| 2013/0290167 A1* | 10/2013 | Laky | .................... | G06Q 40/025 |
| | | | | 705/38 |
| 2014/0067650 A1* | 3/2014 | Gardiner | ............. | G06Q 40/025 |
| | | | | 705/38 |
| 2017/0206604 A1* | 7/2017 | Al-Masoud | ............ | G06Q 40/04 |
| 2017/0300911 A1* | 10/2017 | Alnajem | ............ | G06Q 20/4014 |

\* cited by examiner

APPLICATION PROGRAMING INTERFACE FOR PROVIDING FINANCIAL-PRODUCT ELIGIBILITY QUOTATION

BACKGROUND

Customers intending to apply for a credit card (or a loan) often face uncertainty as to whether they will be approved for the credit card or loan. While it is possible for customers to check their credit scores with credit reference agencies, these credit scores do not necessarily correspond to the customers' chances of being approved for certain credit card products. For example, a customer with a near perfect credit score may still be denied for a credit card if her financial condition does not comply with the specific credit policy of a credit card issuer.

Thus, some financial service providers (e.g., credit card issuers) have started to offer quotation services providing a preliminary evaluation of the customer's likelihood of getting approved for a given financial product. But these quotation services lack accuracy and do not effectively reduce the uncertainty surrounding the credit application process. Current quotation services are often administrated by a third-party service provider relying on summarized versions of the customer's credit file. Thus, because the actual credit card application is still decided on by the credit card issuer itself, which will consider the customer's full credit file, the quotation result generated by the third-party service provider may not match the credit card issuer's final decision on the credit card application. The limitation on the data availability makes it difficult for current solutions to increase the accuracy of the quotation.

Further, because of the trouble associated with exactly administering the credit policy and obtaining/processing data, the third-party service provider typically encounters difficulty in developing an accurate computer model to determine the eligibility for a credit card product. This further contributes to inaccurate quotation results due to the lack of consistency.

In view of the shortcomings and problems with traditional credit card eligibility quotation services, there is a need for accurately and quickly quoting a customer's eligibility for a credit card product. The disclosed methods and systems address one or more of the problems listed above.

SUMMARY

In the following description, certain aspects and embodiments of the present disclosure will become evident. It should be understood that the disclosure, in its broadest sense, could be practiced without having one or more features of these aspects and embodiments. It should also be understood that these aspects and embodiments are merely exemplary.

The present disclosure provides methods and systems for providing quotation, in a timely fashion, for a customer's eligibility for or likelihood of being approved for certain financial products, such as credit card products. The quotation result is in the form of a score quantitatively measuring the likelihood, and/or a definite "yes" or "no" answer. In particular, the disclosed systems may be implemented as an application programming interface, which enables not only a financial service provider providing the financial products but also any third-party entity to provide the quotation service. Additional aspects of the disclosed embodiments are set forth below in this disclosure.

Consistent with the present embodiments, a system for quoting a customer's eligibility for a financial product is disclosed. For example, the system may include a memory storing instructions. The system may also include a processor configured to execute the instructions to: receive a quotation request from a client device associated with the customer, the quotation request including customer-identifying information; acquire, from a second source, information relating to a level of risk associated with the customer-identifying information; aggregate the customer-identifying information and the information relating to the level of risk; extract a plurality of variables from the aggregated data; determine an eligibility score based on the extracted variables and an eligibility model, the eligibility score indicating a likelihood of being approved for the financial product; and provide the eligibility score to the client device.

Consistent with the present embodiments, a computer-implemented method for quoting a customer's eligibility for a financial product is disclosed. For example, the method may include receiving a quotation request from a client device associated with the customer, the quotation request including customer-identifying information. The method may also include acquiring, from a second source, information relating to a level of risk associated with the customer-identifying information. The method may also include aggregating the customer-identifying information and the information relating to the level of risk. The method may also include extracting a plurality of variables from the aggregated data. The method may also include determining an eligibility score based on the extracted variables and an eligibility model, the eligibility score indicating a likelihood of being approved for the financial product. The method may further include providing the eligibility score to the client device.

Consistent with the present embodiments, a non-transitory computer readable medium is disclosed. For example, the medium may store instructions, which when executed, cause at least one processor to perform a method for quoting a customer's eligibility for a financial product. The method may include receiving a quotation request from a client device associated with the customer, the quotation request including customer-identifying information. The method may also include acquiring, from a second source, information relating to a level of risk associated with the customer-identifying information. The method may also include aggregating the customer-identifying information and the information relating to the level of risk. The method may also include extracting a plurality of variables from the aggregated data. The method may also include determining an eligibility score based on the extracted variables and an eligibility model, the eligibility score indicating a likelihood of being approved for the financial product. The method may further include providing the eligibility score to the client device.

The foregoing general description and the following detailed description are exemplary and explanatory only and are not restrictive of the claims.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DESCRIPTION OF THE EMBODIMENTS

Reference will now be made in detail to the disclosed embodiments, examples of which are illustrated in the accompanying drawings. Wherever convenient, the same reference numbers will be used throughout the drawings to refer to the same or like parts.

Disclosed embodiments include, for example, systems and methods for providing an application programming interface ("the API"), which may be developed as a web service or mobile application for providing quotation of a customer's eligibility for certain financial products, such as credit products provided by a financial service provider. The API enables a quotation result to be generated in a timely fashion, i.e., within seconds after receiving the customer's request for the quotation.

Figure 1:
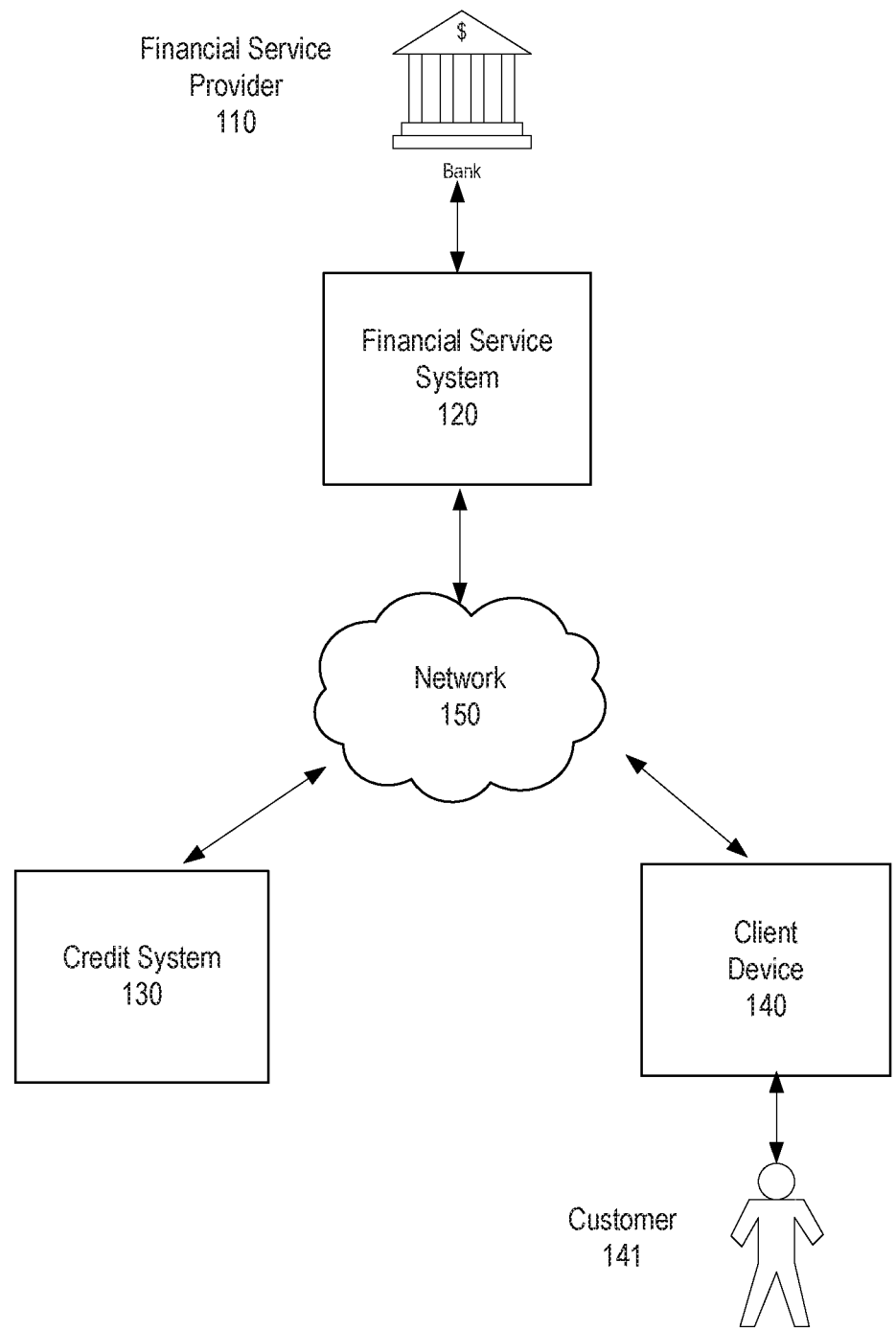
FIG. 1 is a block diagram of an exemplary system, consistent with disclosed embodiments.

FIG. 1 is a diagram illustrating an exemplary system 100 for performing one or more operations consistent with the disclosed embodiments. Referring to FIG. 1, system 100 may include a financial service provider 110, a financial service system 120, a credit system 130, one or more client devices 140, one or more customers 141, and a network 150. The components and arrangement shown in FIG. 1 is not intended to be limiting to the disclosed embodiment as the components used to implement the processes and features here may vary. Thus, system 100 may further include other components that perform or assist in the performance of one or more processes consistent with the disclosed embodiments.

Financial service provider 110 may be an entity that provides financial services. For example, financial service provider 110 may be a bank, credit card issuer, or other type of financial service entity that configures, offers, provides, and/or manages financial service accounts, such as credit card accounts, loan accounts, debit card accounts, checking or savings accounts, and/or loyalty accounts. These financial service accounts and associated financial service account cards may be used by customers 141 to purchase goods and/or services. In some embodiments, financial service provider 110 may include or be associated with financial service system 120, which may be configured to perform one or more aspects of the disclosed embodiments.

Financial service system 120 may be one or more systems associated with one or more entities, such as financial service provider 110. Consistent with the present disclosure, financial service system 120 may be configured to determine a customer's eligibility for a financial product, such as a credit card product, provided by financial service provider 110. In the disclosed embodiments, financial service system 120 may be owned and/or directly operated by financial service provider 110 to provide quotation about a customer's likelihood of being approved for a credit card. Alternatively, financial service system 120 may be developed and operated by a third-party service provider who is authorized by financial service provider 110 to perform the quotation according to the credit policy of financial service provider 110.

Financial service system 120 may be configured to provide one or more credit card eligibility quotation tools. For example, the credit card eligibility quotation tools may allow financial service system 120 to provide an user interface for a customer to submit a request for determining the customer's eligibility for a credit card, receive a completed quotation request, assess the income, creditworthiness, risk, etc. associated with the customer (with the assistance of credit system 130, for example), determine the customer's eligibility for the credit card products provided by financial service provider 110, identify one or more credit card products that the customers are eligible for, and/or provide the quotation result to another component of system 100, such as client device 140. In some embodiments, when determining that the customer is eligible for, i.e., pre-approved for, one or more credit card products, financial service system 120 may identify one or more credit card products that the customers are eligible for, and/or provides these identified, i.e., pre-approved, credit card products to another component of system 100, such as client device 140. In an exemplary embodiment, financial service system 120 may further include a credit card application tool that allows an eligible customer to submit an application for the pre-approved credit card(s).

Financial service system 120 may include one or more components that perform processes consistent with the disclosed embodiments. For example, financial service system 120 may include one or more computers (e.g., servers, database systems, etc.) configured to execute software instructions programmed to perform aspects of the disclosed embodiments, such as receiving a quotation request from a customer, collecting data regarding the customer's financial activities, computing an eligibility score for certain credit card product, presenting the quotation result to the customer, etc.

Consistent with disclosed embodiments, financial service system 120 may include other components and infrastructure that enable it to perform operations, processes, and services consistent with disclosed embodiments. In addition, financial service system 120 may be configured to communicate with other components of system 100 in order to provide one or more of the features described herein.

Credit system 130 may be one or more computer systems associated with a third-party credit reporting entity. For example, credit system 130 may be individually associated with existing credit bureaus (e.g., Experian®, Equifax®, Callcredit®, Tans Union®) that maintain credit information (e.g., credit reports, credit scores, etc.) in association with individuals (e.g., information identifying particular individuals).

In some embodiments, system 100 may be configured to switch among different credit systems 130 (i.e., different credit bureaus) based on performance of the credit bureaus, such as response speeds of the bureaus' databases and the comprehensiveness of the credit information provided by the bureaus. For example, if a particular credit bureau has a faster response speed than others, system 100 may select the credit bureau to draw the credit information, so as to improve the overall response speed of system 100.

Credit system 130 may include one or more computing systems that are configured to perform computer-implemented processes, such as a server, desktop computer, laptop, mobile device with computing ability, etc. In an exemplary embodiment, credit system 130 may be configured to provide information and/or services related to the assessment of risk and/or creditworthiness of a customer. For example, credit system 130 may be configured to receive credit report inquiries from financial service system 120, identify requested credit information, and provide credit report information to financial service system 120.

In some embodiments, credit system 130 may be configured to differentiate between a "soft" credit inquiry and a "hard" credit inquiry. For example, credit system 130 may be configured to determine that a credit inquiry is for eligibility quotation purposes, and thus, is a "soft" credit inquiry. Similarly, credit system 130 may be configured to determine that a credit inquiry is related to an application for a binding financing agreement, and thus, is a "hard" credit inquiry. For the purposes of this disclosure, a "soft" credit inquiry may be a credit inquiry that is not visible to other lenders, is not considered when calculating an individual's credit scores, and/or otherwise does not of itself substantively affect an individual's risk profile and/or creditworthiness. A "hard" credit inquiry may be a credit inquiry that could have an effect on an individual's credit reports, credit scores, risk profile, creditworthiness, etc.

Client device 140 may be one or more computing devices that are configured to execute software instructions for performing one or more operations consistent with the disclosed embodiments. Client device 140 may be a desktop computer, a laptop, a server, a mobile device (e.g., tablet, smart phone, etc.), embedded system, dedicated hardware system, etc. Client device 140 may include interface hardware (e.g., a display device) included in, or connected to, client device 140 for displaying user interfaces generated by and/or received from a component of system 100. Client device 140 may be used by customer 141 to perform functions consistent with disclosed embodiments.

Client device 140 may include one or more processors configured to execute software instructions stored in memory, such as memory included in client device 140. Client device 140 may include software that when executed by one or more processors performs known Internet-related communications and content display processes. For instance, client device 140 may execute browser software that generates and displays user interfaces including content on interface hardware included in, or connected to, client device 140.

In some embodiments, client device 140 may be a mobile device that stores and executes mobile applications ("apps") that provide financial service related functions offered by financial service provider 110, such as a mobile banking app for controlling, configuring, and viewing information relating to financial accounts, etc., and/or a quotation app that provides one or more of the credit card eligibility quotation tools disclosed herein.

Network 150 may be any type of network that facilitates communications and data transfer between components of system 100, such as, for example, financial service system 120, credit system 130, and client device(s) 140. Network 150 may be a Local Area Network (LAN), a Wide Area Network (WAN), such as the Internet, and may be a single network or a combination of networks. Further, network 150 may reflect a single type of network or a combination of different types of networks, such as the Internet and public exchange networks for wireline and/or wireless communications. Network 150 may utilize cloud computing technologies that are familiar in the marketplace. Network 150 is not limited to the above examples and system 100 may implement any type of network that allows the entities (shown and not shown) included in FIG. 1 to exchange data and information.

Figure 2:
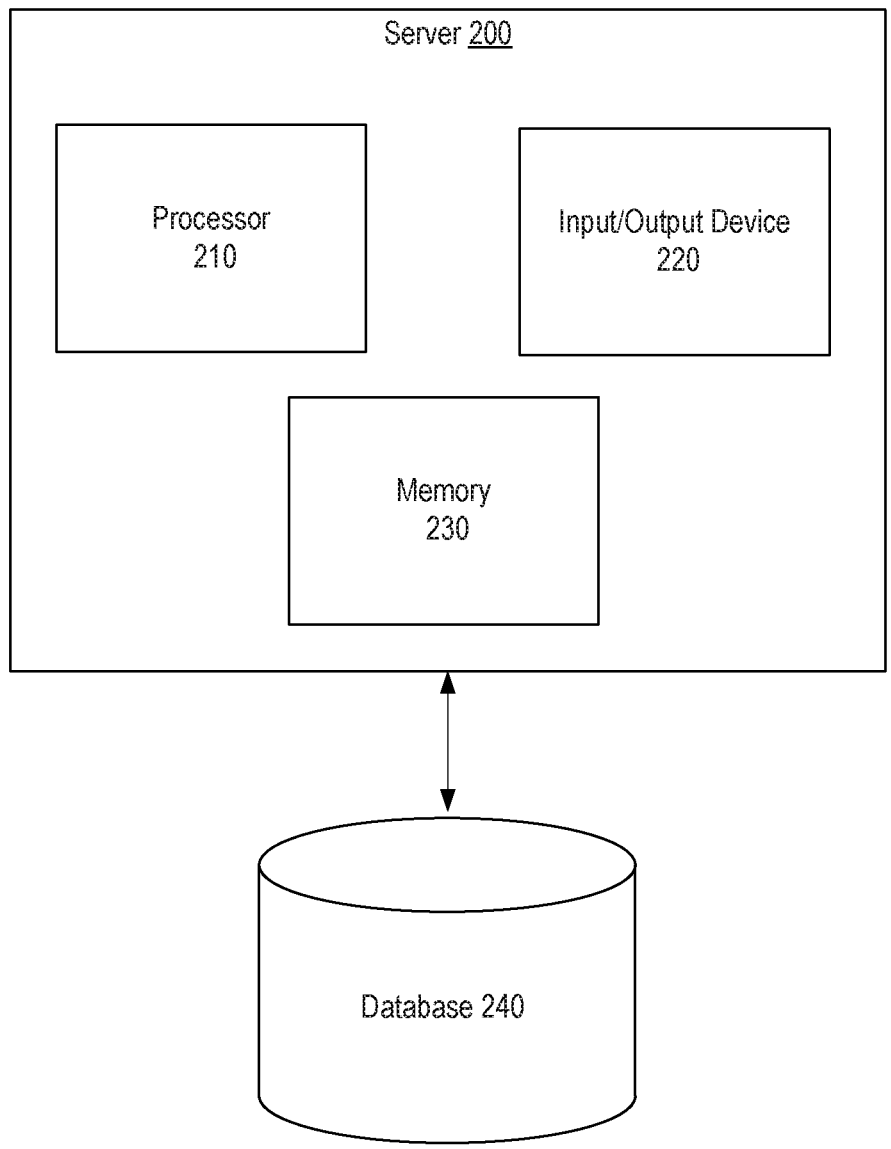
FIG. 2 is a block diagram of an exemplary server, consistent with disclosed embodiments.

FIG. 2 depicts a server 200, consistent with disclosed embodiments. In an exemplary embodiment, financial service system 120 may include server 200. Server 200 may be one or more computing devices configured to execute software instructions stored in memory to perform one or more processes consistent with the disclosed embodiments. For example, server 200 may include one or more memory devices storing data and software instructions and one or more processor configured to use the data and execute the software instructions to perform server-based functions and operations known to those skilled in the art. Server 200 may be configured to execute stored software instructions to implement the API for providing credit card eligibility quotation service in a manner consistent with the disclosed embodiments.

It should be understood, however, that although server 200 may be depicted and described herein as a component of financial service system 120 for ease of discussion, a server 200 or variations thereof may be used alternatively or additionally by credit system 130, client device 140, and/or other components of system 100 (shown and not shown) to perform processes consistent with disclosed embodiments.

In one embodiment, server 200 may include one or more processors 210, one or more input/output (I/O) devices 220, and one or more memories 230. According to some embodiments, server 200 may comprise web server(s) or similar computing devices that generate, maintain, and provide web site(s) consistent with disclosed embodiments. Server 200 may be standalone, or it may be part of a subsystem, which may be part of a larger system. For example, server 200 may represent distributed servers that are remotely located and communicate over a network (e.g., network 150) or a dedicated network, such as a LAN.

Processor 210 may include one or more known processing devices, such as a microprocessor from the Pentium™ or Xeon™ family manufactured by Intel™, the Turion™ family manufactured by AMD™, or any of various processors manufactured by Sun Microsystems. The disclosed embodiments are not limited to any type of processor(s) configured in server 200.

I/O devices 220 may be one or more devices configured to allow data to be received and/or transmitted by server 200. I/O devices 220 may include one or more user I/O devices and/or components, such as those associated with a keyboard, mouse, touchscreen, display, etc. I/O devices 220 may also include one or more digital and/or analog communication devices that allow server 200 to communicate with other machines and devices, such as other components of system 100. I/O devices 220 may also include interface hardware configured to receive input information and/or display or otherwise provide output information. For example, I/O devices 220 may include a monitor configured to display a user interface.

Memory 230 may include one or more storage devices configured to store instructions used by processor 210 to perform functions related to disclosed embodiments. For example, memory 230 may be configured with one or more software instructions associated with programs and/or data. Memory 230 may include a single program that performs the functions of the server 200, or multiple programs. Additionally, processor 210 may execute one or more programs located remotely from server 200. For example, financial service system 120, credit system 130, and/or client device 140, may, via server 200, access one or more remote programs that, when executed, perform functions related to disclosed embodiments. Memory 230 may also store data that may reflect any type of information in any format that the system may use to perform operations consistent with the disclosed embodiments.

Server 200 may also be communicatively connected to one or more databases 240. For example, server 200 may be communicatively connected to database 240 through network 150. Database 240 may include one or more memory devices that store information and are accessed and/or managed through server 200. By way of example, database 240 may include Oracle™ databases, Sybase™ databases, or other relational databases or non-relational databases, such as Hadoop sequence files, HBase, or Cassandra. The databases or other files may include, for example, data and information related to the source and destination of a network request, the data contained in the request, etc. Systems and methods of disclosed embodiments, however, are not limited to separate databases. In one aspect, server 200 may include database 240. Alternatively, database 240 may be located remotely from the server 200. Database 240 may include computing components (e.g., database management system, database server, etc.) configured to receive and process requests for data stored in memory devices of database 240 and to provide data from database 240.

Figure 3:
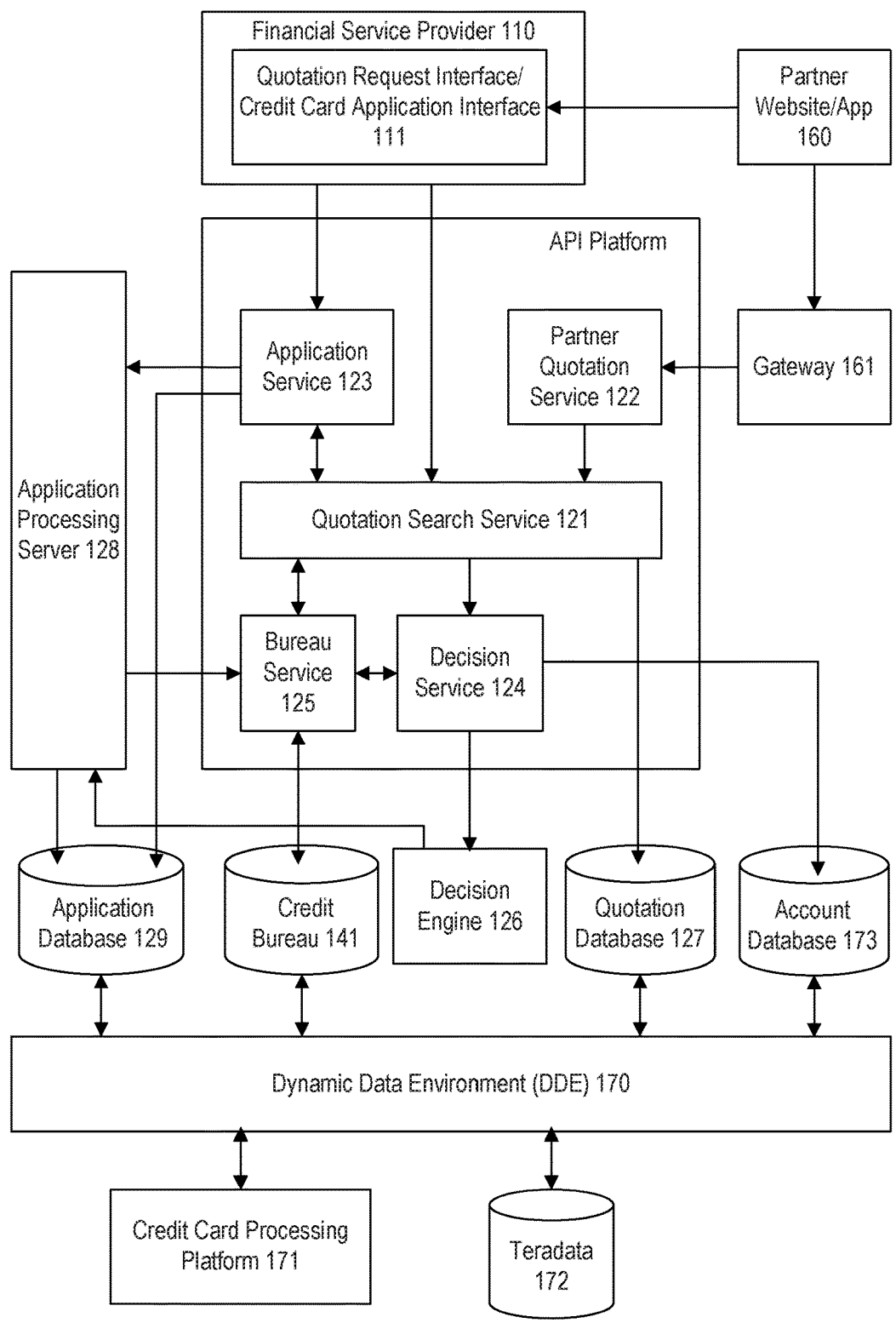
FIG. 3 is a block diagram of an exemplary system associated with the use of a real-time application programming interface configured in accordance with disclosed embodiments for providing credit card eligibility quotation.

As explained, the disclosed embodiments include methods and systems for providing an API for determining a customer's eligibility for credit card products in a timely fashion. FIG. 3 is a block diagram illustrating a system 300 associated with the use of a real-time API configured in accordance with disclosed embodiments for providing credit card eligibility quotation. The operations and functions of system 300 are similar to those of system 100 (FIG. 1), with the modules illustrated in FIG. 3 (as well as other modules not necessarily illustrated in FIG. 3) being implemented in the form of an API. The API is a set of protocols for requesting and processing information related to credit card eligibility determination. For example, referring to FIG. 3, quotation search service 121, partner quotation service 122, application service 123, decision service 124, and bureau service 125 are part of a real-time API platform configured to perform operations consistent with disclosed embodiments. The real-time API platform enables hardware (such as a mobile device, computer, electronic components, or the like), firmware (such as ROM or other hard-wired logic components, or the like), and software (such as operating systems, application programs, or the like) to all interact with one another.

Referring to FIG. 3, the exemplary implementation may involve operations performed by one or more components of a system consistent with disclosed embodiments. In one aspect, financial service provider 110 may provide, via, e.g., a website or a mobile app operated by financial service provider 110, a quotation request interface 111 for a customer to submit a quotation request and enter information used for determining credit card eligibility. In some embodiments, the quotation request may be submitted as part of a credit card application process, and the information provided by the customer for applying a credit card is used to facilitate the eligibility determination. Accordingly, in these embodiments, quotation request interface 111 may be implemented as a credit card application interface 111 for receiving a customer's application for a credit card. The collected quotation request may be transmitted to financial service platform 120, or more specifically the module of quotation search service 121, to initiate the eligibility determination process.

In some embodiments, financial service provider 110 may also collaborate with a partner website (e.g., www.moneysupermarket.com) and/or app 160 to solicit a quotation request and/or an application for a credit card product provided by financial service provider 110. Partner website/app 160 may transmit the collected quotation request and/or application to financial service provider 110, who then relays the information regarding the quotation to quotation search service 121. Alternatively or additionally, partner website/app 160, via a gateway 161, may provide the collected quotation request directly to financial service system 120, or more specifically, the module of partner quotation service 122, which then relays the information regarding the quotation to quotation search service 121.

After receiving the quotation request, quotation search service 121 may query internal databases of financial service provider 110 to determine whether the customer already has an existing credit card application or financial service account with financial service provide 110. For example, such internal databases may include application database 129 configured to store credit card applications or account database 173 configured to store financial account information. As illustrated in FIG. 3, quotation search engine 121 may access application database 129 via application service 123, to draw the application information. If quotation search service 121 determines that the customer currently has an active credit card application, quotation search service 121 may decline the quotation request to avoid creating interference in the application process. As another example, if the quotation request is submitted by an existing customer of financial service provider 110, quotation search service 121 may determine whether the customer's existing account(s) is in good standing. If the existing account(s) is not in good standing or has associated with fraudulent activities, quotation search service 121 may decline the quotation request or conclude the customer is not eligible for any credit card product.

If quotation search service 121 does not conclude that the quotation request should be declined or the customer is unqualified for any credit card product, quotation search service 121 may further query quotation database 127 to determine whether a quotation has been conducted for the customer recently, e.g., within the last month or week. Quotation database 127 is configured to store data related to previously performed quotations, including customer information, quotation requests, quotation results, credit bureau data, etc.

If another quotation has been performed for the customer within a predetermined time frame (e.g., a month prior to the current quotation request), quotation search service 121 may determine data related to the past quotation can be used as the basis for performing the current quotation and submit the data to decision service 124. This is because a customer's credit history, including credit bureau data, usually does not change much during one month. Moreover, continuing to using the information as first provided may prevent a customer from cheating the system by artificially adjusting the provided information, e.g., increasing the stated income after finding the previously entered income value is treated by the system unfavorably.

If no quotation has been performed for the customer in the predetermined short time frame, quotation search service 121 may determine that system 300 does not contain credit bureau data usable for performing the current quotation. Accordingly, quotation search service 121 may contact bureau service 125 to retrieve the customer's credit information (e.g., credit report, credit score, etc.) from credit bureau 141. Credit bureau 141 includes database(s) maintained by one or more credit bureaus, such as Xperian®, Equifax®, Callcredit®, and is part of credit system 130 (FIG. 1). Bureau service 125 may return the retrieved credit bureau data to quotation search service 121, which then submit the credit bureau data to decision service 124 for further processing. Alternatively, bureau service 125 may return the retrieved credit bureau data directly to decision service 124.

Decision service 124 is configured to aggregate the quotation request (including the customer information), credit bureau data, and other information for performing the quotation. For example, as illustrated in FIG. 3, account database 173 may store information regarding historical and current financial accounts held by the customer. These financial accounts may be provided by financial service provider 110 and/or other financial institutions. Decision service 124 may access account database 173 to collect the account information. Decision service 124 is further configured to parse and analyze the aggregated data. Decision service 124 may then submit the aggregated data to decision engine 126 for computing a score (hereinafter referred to as "eligibility score") indicative of the customer's likelihood of being approved for one or more credit card products.

Decision engine 126 may be implemented in software, hardware, firmware, a mix of any of those, or the like. Decision engine 126 may be configured to use, for example, a text mining algorithm to extract a plurality of variables from the aggregated data. Decision engine 126 may also be configured to use the variables to compute the eligibility score based on an eligibility model. The eligibility model may be product specific. That is, different models may be used to compute eligibility scores associated with different credit card products. Decision engine 126 may be further configured to, based on the eligibility score, reach a decision as to whether the customer is eligible for certain credit card products. In one embodiment, the eligibility score may have a score of 10. When the eligibility score is above a predetermined threshold (e.g., 8), decision engine 126 may conclude that the customer is eligible for certain credit card products. Otherwise, decision engine 126 may conclude that customer is not eligible for the credit card products.

Decision engine 126 may return the decision on the eligibility to the customer via a client device, e.g., client device 140 (not shown in FIG. 3). In some embodiments, if the customer is determined to be eligible for a credit card product, decision engine 126 may also transmit the decision to application processing server 128 for processing an application associated with the pre-approved credit card.

In some embodiments, financial service provider 110 may submit the applications for credit cards, received directly from customers or received via partner website/app 160, to application service 123, which relays the applications to application processing server 128 for further processing. Similar to the above-described quotation process, application processing server 128 may also access the credit bureau 141 via bureau service 125. But the credit bureau data inquiry initiated by application processing server 128 is a "hard" inquiry, which may affect a customer's credit history, whereas the credit bureau data inquiry initiated by quotation search service 121 is a "soft" inquiry, which does not affect a customer's credit history.

The above-described real-time API employed by system 300 is capable of requesting and processing the complex credit bureau data and proprietary data of financial service provider 110 to generate a definite decision, i.e., "yes" or "no," on a customer's eligibility for certain credit card products. As illustrated in FIG. 3, quotation data base 127, application database 129, and credit bureau 141 may communicate with a dynamic data environment (DDE) 170 that provides abundance of data for determining customers' eligibility for credit card products. For example, DDE 170 may include a credit card processing platform 171, e.g., TS2 offered by Total System Services Inc. (TSYS). Credit card processing platform 171 may be configured to provide a full range of credit card processing services, from credit approval to production and mailing of cards, to authorizing domestic and international purchases, preparation and mailing of billing statements, and customer service support, as well as merchant accounting and other merchant support services. Credit card processing platform 171 may upload daily the credit card transaction data to teradata 172, which is a database for storing and organizing the data related to credit card products operated by financial service provider 110. Credit card processing platform 171 may also provide the credit card transaction data to account database 173 via DDE 170.

Teradata 172 may also store information received from sources other than credit card processing platform 171, including any type of lenders, borrowers, brokers, and/or other information sources. For example, teradata 172 may store information received from county property or tax records, Department of Commerce, Bureau of Labor statistics, IRS statistics on income, etc.

System 300 may use the data stored in teradata 172 to perform the quotation of customers' eligibility for credit card products. For example, the data stored in teradata 172 may be used to analyze customers' credit card usage behavior with their credit worthiness. Such analysis result may be used to construct, refine, and correct the eligibility models employed by decision engine 126, so as to improve the accuracy of the eligibility quotation.

Figure 4:
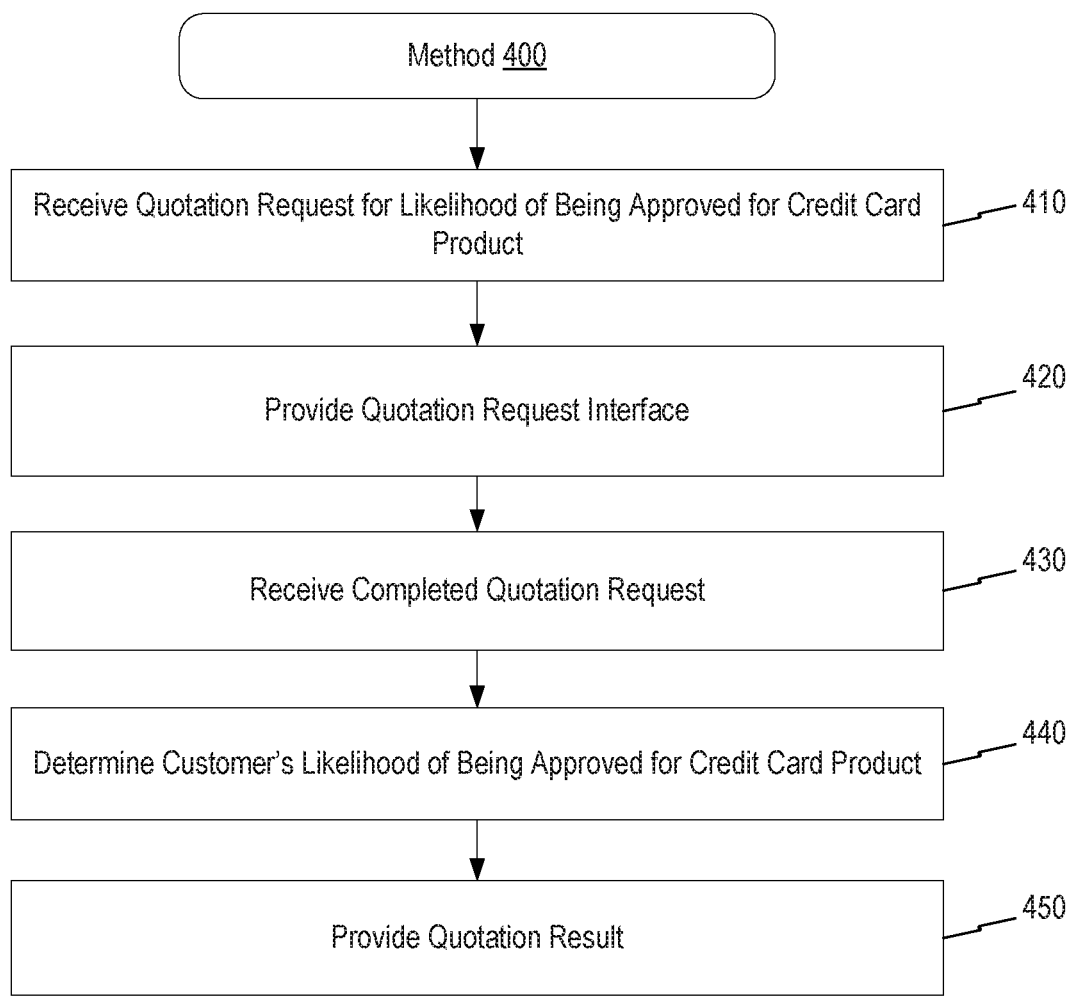
FIG. 4 is a flowchart of an exemplary method for providing quotation of a customer's eligibility for certain credit card products, consistent with disclosed embodiments.

Next, methods consistent with the disclosed embodiments will be described in connection with system 100. FIG. 4 is a flowchart of an exemplary method 400 for providing quotation of a customer's eligibility for certain credit card products. In one embodiment, financial service system 120 may perform one or more of the steps of method 300 to provide a credit card eligibility quotation tool to client device 140. Through such a tool, financial service system 120 may provide client device 140 with a customer's likelihood of being approved for a credit card product or any other type of loan products. In exemplary embodiments, the likelihood may be presented to client device 140 as a quantitative score, or a descriptive phrase such as "yes" or "no."

In step 410, financial service system 120 may receive a quotation request for the likelihood of being approved for a credit card product. Financial service system 120 may receive the quotation request from client device 140 associated with a customer. The quotation request may include any information that initiates a quotation process. In one example, financial service system 120 may provide an advertisement or notice to client device 140, which client device 140 may display (e.g., via a web browser, mobile app, etc.). The advertisement or notice may describe the quotation process. Client device 140 may receive input (e.g., from a customer) indicating that the customer wants to initiate the quotation process. Client device 140 may create a corresponding quotation request and send the request to financial service system 120.

In step 420, financial service system 120 may provide a quotation request interface. For example, financial service system 120 may provide a quotation request interface to client device 140. Client device 140 may display the quotation request interface using display hardware. The quotation request interface may include, for example, a fillable form with one or more prompts for requested information. The requested information may include information identifying a customer that is seeking quotation. For example, the requested information may include at least customer name and residential address, and may also include other identifying information, such as date of birth, social security number, driver's license number, email address, phone number, etc. The requested information may also include the customer's employment condition, including but not limited to employment status, current occupation, yearly/monthly income, etc. The quotation request form may further present one of more key questions for the customer to answer, such as questions related to the customer's financial needs. For example, the customer may be requested to answer whether she is interested in an immediate cash advance. In some embodiments, the requested information may include information identifying a financial account held by the customer and maintained by, for example, financial service provider 110. For example, the requested information may include an account number, card number, pin number, etc., which may allow financial service system 120 to identify a corresponding financial account and determine customer-identifying information (e.g., based on information associated with the corresponding financial account).

In step 430, financial service system 120 may receive a completed quotation request. Financial service system 120 may receive the completed quotation request from client device 140. In one example, the customer may provide input to client device 140, the input including the requested information. In other words, the customer may operate client device 140 to fill out the quotation request form. Client device 140 may send the completed quotation request to financial service system 120.

In step 440, financial service system 120 may determine the customer's likelihood of being approved for a credit card product. Financial service system 120 may determine the likelihood based on data collected from a variety of sources, including the requested information from the completed quotation request form, credit reports and credit scores provided by one or more credit bureaus, information regarding existing financial accounts held by the customer, information regarding pending or recent credit card applications submitted by the customer, etc. The likelihood may be expressed as an eligibility score, e.g., in a scale of 10. The eligibility score may be configured to be proportional to the likelihood of being approved for a credit card product. The higher the score is, the more likely the customer is approved for a credit card product. In one embodiment, a threshold may be predetermined such that when the eligibility score is above the threshold, financial service system 120 may conclude that the customer is likely to be approved for one or more credit card products.

In some embodiments, when the customer is determined to be eligible for credit card products provided by financial service provider 110, financial service system 120 may further identify one or more pre-approved credit card products for the customer and configure the terms of the pre-approved credit card products. For example, financial service system 120 may determine the credit limit (e.g., up to $4,000, up to $20,000, etc.), a cash advance limit, and an interest rate or range of interest rates for the credit card product (e.g., 20.9% APR, 13.25-18.75% APR, etc.). Financial service system 120 may use a credit policy and pricing program administered by financial service provider 110 to determine the pre-approved credit card product. For example, financial service system 120 may use credit information and one or more risk assessment tools to determine acceptable terms of a credit card product for the customer.

In an exemplary embodiment, a pre-approved credit card offer may be an offer that reflects the willingness of financial service provider 110 to provide the credit, should the terms of the pre-approved credit card offer be accepted by the customer. Consistent with disclosed embodiments, however, the credit card offer may be pre-approved in that the customer has not actually applied for a credit card and has only inquired into such a credit card. In this way, the customer's inquiry will not negatively affect the customer's credit history reports and scores. According to the typical credit reporting practices, applications for a binding credit card agreement can be added to credit reports and considered in credit scores, while inquiries for pre-approval are not. In order to allow the customer to rely on the pre-approved offer, however, financial service system 120 may be configured to honor the terms of the pre-approved offer should the customer accept the terms and submit a completed credit card application.

In step 450, financial service system 120 may provide the quotation result. For example, financial service system 120 may provide the quotation result to client device 140. Client device 140 may display the quotation result using display hardware. In some embodiments, the quotation result may be presented as the determined eligibility score, with an accompanying message explaining the correspondence between the eligibility score and likelihood of being approved for a credit card product provided by financial service provider 110.

When the customer is determined to be eligible for one or more pre-approved credit card products, the quotation result may also recommend one or more of the pre-approved credit card product for the customer to apply. Client device 140 may display the terms of the recommended credit card product and provide a link to apply for the recommended credit card product. Should the customer choose to apply for the pre-approved credit card product, financial service system 120 may prepopulate the application form with information (e.g., name, address, social security number, etc.) supplied by the customer during the quotation stage, so as to save the customer's work.

When it is determined that the customer is not eligible for any credit card product, financial service system 120 may provide information to client device 140 indicating that the customer is not eligible for a credit card product or loan. In some embodiments, the information may include the reasons for the non-eligibility. For example, if customer submitted false information in the quotation request, financial service system 120 may instruct client device 140 to display the following message: "We can't lend to you because the information you have given doesn't match the information with the credit reference agencies."

Figure 5:
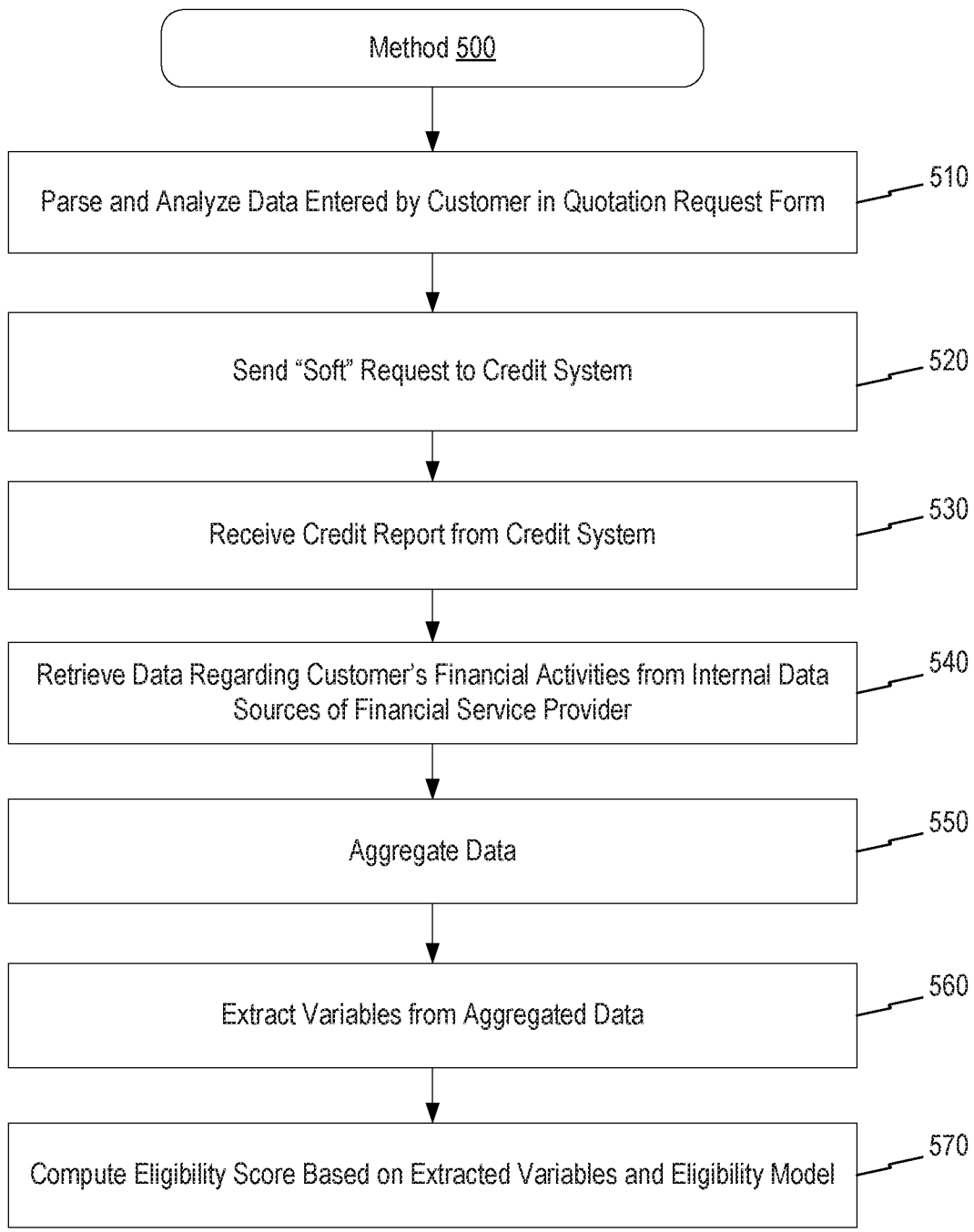
FIG. 5 is a flowchart of a method for determining a customer's eligibility for certain credit card products, consistent with disclosed embodiments.

FIG. 5 is a flowchart of an exemplary method 500 for determining a customer's eligibility for certain credit card products, consistent with disclosed embodiments. In some embodiments, financial service system 120 may perform one or more of the steps of method 500 to determine a customer's eligibility for, or likelihood of being approved for, certain credit card products provided by financial service provider 110. In this way, method 500 may correspond to an exemplary embodiment of step of 440 of method 400.

In certain aspects, method 500 may include steps that provide an eligibility score or a "yes" or "no" decision on the customer's quotation, so as to eliminate the uncertainty over being approved for a credit card. Moreover, method 500 may include steps that allow financial service system 120 to access the risk, creditworthiness, etc. of a customer and make an eligibility determination based thereon, while maintaining the credit history status of a quotation inquiry. In this way, financial service system 120 can perform the quotation without risking adversely affecting the customer's history.

In step 510, financial service system 120 may parse and analyze the data entered by the customer in the quotation request form. For example, financial service system 120 may use a text mining algorithm to analyze the customer-entered information. For example, financial service system 120 may clean, format, and consolidate the customer-entered data so that the data is easier to manipulate. The customer-entered data may have typographical errors, abbreviations, synonyms, near homonyms, symbols (or lack of symbols), or other errors that make consolidating the data difficult. Words may be expanded to remove abbreviations based on lists of abbreviations, expansions, and substitutions in order to substitute the complete word for the abbreviated word. In certain embodiments, a list of stop words (i.e., words that do not add special meaning such as "and," "the," etc.) and/or a list of special characters and punctuation (e.g., #, $, %) may be used to remove stop words and special characters from the data (e.g., to change 11,000.00" to "1000"). Alternatively, a list of special characters and punctuation may be used to add special characters from the data (e.g., to convert "1000" to 11,000.00"). One or more dictionaries may also be used to check the spelling of words in the data, replacing the misspellings with correctly spelled words. Natural language processing or other processing may also be used to group data within certain criteria (e.g., to convert "st." into "street").

In step 520, financial service system 120 may send a "soft" request to credit system 130. For example, financial service system 120 may transmit customer-identifying information to one or more credit systems 130 as part of a "soft" inquiry for credit history information (e.g., credit reports and/or credit scores). In an exemplary embodiment, the request may include information identifying the request as a "soft" inquiry. For example, the request may include, in addition to the customer identifying information, a reference code that indicates the request is for quotation purpose and is not a full credit search. The reference code may indicate that the request is part of a quotation process, and thus, is not to have an effect on the customer's credit history.

In some embodiments, financial service system 120 may switch among different credit systems 130 (i.e., credit bureaus) based on performance of the credit systems 130. For example, if a credit bureau responds to credit information inquiries particularly fast during an identified time window of a day, financial service system 120 may send the inquiries to this credit bureau during the identified time window, and to other bureaus during other time.

In step 530, financial service system 120 may receive credit report(s) from credit system 130. Financial service system 120 may receive the credit report(s) in response to the request sent to the credit system 130 in step 520. The received credit reports may include any and all credit information that is stored by credit system 130 and which may allow financial service system 120 to assess the risk and creditworthiness of the customer. That is, the credit report(s) may include all of the information that would be provided in response to a final credit card application, even though the request sent to credit system 130 was a "soft" request. In this way, financial service system 120 can rely on the information in the credit reports to the same degree as if it were credit report information provided in response to a final credit card application.

In step 540, financial service system 120 may retrieve data regarding the customer's financial activities from internal data sources of financial service provider 110. For example, if the customer has existing financial accounts with financial service provider 110, financial service system 120 may collect records showing the account activities. For another example, if the customer has a pending credit card application with financial service provider 110, financial service system 120 may collect information submitted by the customer during that application.

In step 550, financial service system 120 may aggregate the data collected from various sources, including but not limited to the data entered by the customer in the quotation request form, the credit report(s), and relevant data internally maintained by financial service provider 110.

In step 560, financial service system 120 may extract variables from the aggregated data, based on an eligibility model. The eligibility model may use as many variables as possible, e.g., 20,000 variables. Each variable may reflect an aspect of the creditworthiness or risk associated with the customer.

In one embodiment, financial service system 120 may extract a plurality of variables representing: the customer's stated income; the customer's occupation and the years of experience in that occupation; an estimated value (or appraisal) for the customer's property (i.e., the customer's current property and/or a property being mortgaged); and the property type (e.g., a condominium, a town house, a single family home, a 2-4 unit dwelling, or a multifamily dwelling).

In one embodiment, financial service system 120 may extract a plurality of variables representing: the customer's credit worthiness, such as credit scores, credit history, delinquencies, outstanding balances on loans, and loan limits; a median price (or appraisal) for properties within a region or, alternatively, an estimated price for the customer's property.

In one embodiment, financial service system 120 may extract a plurality of variables representing demographic information, such as income estimates (or statistics) based on the customer's occupation, experience, and region, such as a street address, neighborhood, city, state, etc.

In one embodiment, financial service system 120 may extract a plurality of variables representing inconsistencies, mismatches, or red flags detected in information entered by the customer in the quotation request form. For example, if the customer provided her employment status as employed but did not provided an occupation, based on historical data, such phenomenon may suggest that the customer does not have a stable job or takes multiple low-paying jobs. Accordingly, financial service system 120 may use one or more variables to indicate that the customer has a high probability of default.

In one embodiment, financial service system 120 may extract a plurality of variables representing the customer's other financial accounts and/or credit card applications associated with financial service provider 110. For example, if the customer already has a checking account with financial service provider 110 and the checking account history indicates that the customer constantly maintains a direct deposit to the checking account, financial service system 120 may use a variable to indicate that the customer has a low risk of default because she has a steady flow of income. For another example, if the customer has another credit card application pending in front of financial service provider 110, financial service system 120 may use a variable to indicate that the customer should be placed in a high risk group of people, because it is usually not desirable to approve multiple credit card applications from the same customer during a short time period.

In step 570, financial service system 120 may compute an eligibility score based on the extracted variables and an eligibility model. Specifically, financial service system 120 may feed the extracted variables to the eligibility model to compute an eligibility score. Financial service system 120 may further use the eligibility score to determine whether the customer is likely to be approved for certain credit card products.

The eligibility model is constructed based on the credit policy of financial service provider 110. In some embodiments, different eligibility models may be used for different credit card products. This is because different credit card products are designed for people with different creditworthiness or credit risks. A customer may be eligible for one credit card product while unqualified for another credit card product. Accordingly, financial service system 120 may compute multiple eligibility scores, indicating the customer's eligibility for different credit card products.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented as hardware alone.

Computer programs based on the written description and methods of this specification are within the skill of a software developer. The various programs or program modules can be created using a variety of programming techniques. For example, program sections or program modules can be designed in or by means of Java, C, C++, assembly language, Python, or any such programming languages. One or more of such software sections or modules can be integrated into a computer system, non-transitory computer-readable media, or existing communications software.

Moreover, while illustrative embodiments have been described herein, the scope includes any and all embodiments having equivalent elements, modifications, omissions, combinations (for example, of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A system for quoting a customer's eligibility for a financial product, the system comprising:
   a memory storing instructions; and
   a processor configured to execute the instructions to perform operations comprising:
      providing an application interface for the customer to request a quotation for a first one of a plurality of financial products;
      receiving a quotation request via the provided interface, the quotation request including customer-identifying information;
      parsing and analyzing the customer-identifying information using a text mining algorithm;
      determining whether a previous quotation has been performed for the customer within a predetermined time frame, the previous quotation associated with a previous quotation request, and the previous quotation request including previous aggregated data related to the previous quotation request;
      obtaining data related to the quotation request by:
         selecting a first source comprising a credit bureau service selected from a plurality of credit bureau services, the selecting being based on:
            a response speed of the bureau service, and
            a level of credit information of the credit bureau service;
         obtaining credit information of the customer from the selected credit bureau service,
         acquiring, from a second source, information relating to a level of risk associated with the customer-identifying information, and
         mining internal customer data to supplement the credit information not available from the selected credit bureau service;
      when the previous quotation has been performed for the customer within the predetermined time frame:
         obtaining the previous aggregated data, and
         aggregating the data related to the quotation request and the previous aggregated data;
      when the previous quotation has not been performed for the customer within the predetermined time frame:
         using the data related to the quotation request as aggregated data;
      storing the aggregated data;
      extracting inconsistencies detected in the aggregated data;
      extracting a plurality of variables from the aggregated data;
      selecting one of a plurality of eligibility models, based on a credit policy associated with the first financial product, the eligibility models corresponding to the financial products;
      determining an eligibility score based on the extracted variables, the extracted inconsistencies, and the selected eligibility model, the eligibility score indicating a likelihood of being approved for the first financial product;
      providing the eligibility score to a client device; and
      when the eligibility score is above a predetermined threshold:
         concluding that the customer is eligible for the first financial product.

2. The system according to claim 1, wherein the processor is further configured to execute the instructions to:
   provide to a third-party an application interface for the customer to apply for the financial product.

3. The system according to claim 1, wherein the customer-identifying information comprises at least one of a name of the customer, date of birth of the customer, an email address of the customer, a residential address of the customer, or answers of the customer to one or more questions presented by the processor.

4. The system according to claim 1, wherein:
   the second source is a credit bureau; and the information relating to the level of risk comprises at least one of a credit report or a credit score provided by the credit bureau.

5. The system according to claim 1, wherein the processor is further configured to execute the instructions to:
acquire account data relating to one or more financial service accounts held by the customer; and
aggregate the account data with the customer-identifying information and the information relating to the level of risk.

6. The system according to claim 1, wherein the processor is further configured to execute the instructions to:
acquire application data relating to one or more pending applications initiated by the customer for the financial product; and
aggregate the application data with the customer-identifying information and the information relating to the level of risk.

7. The system according to claim 1, wherein the financial product is a credit card product.

8. A computer-implemented method for quoting a customer's eligibility for a financial product, the method comprising:
receiving a quotation request from a client device associated with the customer, the quotation request including customer-identifying information;
acquiring, from a first source, information relating to a level of risk associated with the customer-identifying information;
parsing and analyzing the customer-identifying information using a text mining algorithm;
determining whether a previous quotation has been performed for the customer within a predetermined time frame, the previous quotation associated with a previous quotation request, and the previous quotation request including previous aggregated data related to the previous quotation request;
obtaining data related to the quotation request by:
selecting a second source comprising credit bureau service selected from a plurality of credit bureau services, the selecting being based on:
a response speed of the bureau service, and
a level of credit information of the credit bureau service;
obtaining credit information of the customer from the selected credit bureau service,
acquiring, from a first source, information relating to a level of risk associated with the customer-identifying information, and
mining internal customer data to supplement the credit information not available from the selected credit bureau service;
when the previous quotation has been performed for the customer within the predetermined time frame:
obtaining the previous aggregated data, and
aggregating the data related to the quotation request and the previous aggregated data;
when the previous quotation has not been performed for the customer within the predetermined time frame:
using the data related to the quotation request as aggregated data;
storing the aggregated data;
extracting inconsistencies detected in the aggregated data;
extracting a plurality of variables from the aggregated data;
selecting one of a plurality of eligibility models, based on a credit policy associated with a first one of a plurality of financial products, from a plurality of eligibility models, the eligibility models corresponding to the financial products;
determining an eligibility score based on the extracted variables, the extracted inconsistencies, and the selected eligibility model, the eligibility score indicating a likelihood of being approved for the first financial product;
providing the eligibility score to the client device; and
when the eligibility score is above a predetermined threshold:
concluding that the customer is eligible for the first financial product.

9. The method according to claim 8, further comprising:
generating an application interface for the customer to apply for the financial product.

10. The method according to claim 8, wherein the customer-identifying information comprises at least one of a name of the customer, date of birth of the customer, an email address of the customer, a residential address of the customer, or answers of the customer to one or more questions presented by the processor.

11. The method according to claim 8, wherein:
the second source is a credit bureau; and
the information relating to the level of risk comprises at least one of a credit report or a credit score provided by the credit bureau.

12. The method according to claim 8, further comprising:
acquiring account data relating to one or more financial service accounts held by the customer;
wherein aggregating the customer-identifying information and the information relating to the level of risk further comprises:
aggregating the account data with the customer-identifying information and the information relating to the level of risk.

13. The method according to claim 8, further comprising:
acquiring application data relating to one or more pending applications initiated by the customer for the financial product;
wherein aggregating the customer-identifying information and the information relating to the level of risk further comprises:
aggregating the application data with the customer-identifying information and the information relating to the level of risk.

14. A non-transitory computer readable medium having stored instructions, which when executed, cause at least one processor to perform a method for quoting a customer's eligibility for a financial product, the method comprising:
receiving a quotation request from a client device associated with the customer, the quotation request including customer-identifying information;
acquiring, from a first source, information relating to a level of risk associated with the customer-identifying information;
parsing and analyzing the customer-identifying information using a text mining algorithm;
determining whether a previous quotation has been performed for the customer within a predetermined time frame, the previous quotation associated with a previous quotation request, and the previous quotation request including previous aggregated data related to the previous quotation request;
obtaining data related to the quotation request by:

selecting a second source comprising a credit bureau service selected from a plurality of credit bureau services, the selecting being based on:
  a response speed of the bureau service, and
  a level of credit information of the credit bureau service;
obtaining credit information of the customer from the selected credit bureau service,
acquiring, from a second source, information relating to a level of risk associated with the customer-identifying information, and
mining internal customer data to supplement the credit information not available from the selected credit bureau service;
when the previous quotation has been performed for the customer within the predetermined time frame:
  obtaining the previous aggregated data, and
  aggregating the data related to the quotation request and the previous aggregated data;
when the previous quotation has not been performed for the customer within the predetermined time frame:
  using the data related to the quotation request as aggregated data;
storing the aggregated data;
extracting inconsistencies, detected in the aggregated data;
extracting a plurality of variables from the aggregated data;
selecting one of a plurality of eligibility models, based on a credit policy associated with a first of a plurality of financial products, the models corresponding to the financial products;
determining an eligibility score based on the extracted variables, the extracted inconsistencies, and the selected eligibility model, the eligibility score indicating a likelihood of being approved for the first financial product;
providing the eligibility score to the client device; and
when the eligibility score is above a predetermined threshold:
  concluding that the customer is eligible for the first financial product.

* * * * *